US009557235B2

(12) United States Patent
Kaindl et al.

(10) Patent No.: US 9,557,235 B2
(45) Date of Patent: Jan. 31, 2017

(54) MACHINES AND METHODS FOR EVALUATING PREVAILING TORQUE THREADED FASTENERS

(71) Applicant: Aztech Engineering Inc., Aurora, IL (US)

(72) Inventors: Michael John Kaindl, Naperville, IL (US); Mark Edward Kaindl, Naperville, IL (US)

(73) Assignee: Aztech Engineering Inc., Aurora, IL (US)

( * ) Notice: Subject to any disclaimer, the term of this patent is extended or adjusted under 35 U.S.C. 154(b) by 0 days.

(21) Appl. No.: 14/978,011

(22) Filed: Dec. 22, 2015

(65) Prior Publication Data

US 2016/0178466 A1  Jun. 23, 2016

Related U.S. Application Data

(60) Provisional application No. 62/096,022, filed on Dec. 23, 2014.

(51) Int. Cl.
| | |
|---|---|
| *B25B 23/14* | (2006.01) |
| *G01L 5/24* | (2006.01) |
| *A47B 81/06* | (2006.01) |
| *E05C 9/18* | (2006.01) |
| *G01L 25/00* | (2006.01) |

(52) U.S. Cl.
CPC ............ *G01L 5/24* (2013.01); *A47B 81/061* (2013.01); *E05C 9/1875* (2013.01); *G01L 25/003* (2013.01)

(58) Field of Classification Search
CPC ...... A47B 81/061; E05C 9/023; E05C 9/1875; G01L 25/003; G01L 5/24

USPC ................... 73/862.08, 862.21, 761
See application file for complete search history.

(56) References Cited

U.S. PATENT DOCUMENTS

| 4,022,299 A | * | 5/1977 | Haraikawa | .......... F16D 65/0979 |
| | | | | 188/196 BA |
| 5,099,678 A | * | 3/1992 | Grabovac | ............. G01L 25/003 |
| | | | | 73/1.11 |
| 5,139,092 A | * | 8/1992 | Boyle | ..................... B25B 5/061 |
| | | | | 173/1 |

(Continued)

FOREIGN PATENT DOCUMENTS

CN  103411721 B  *  1/2015

*Primary Examiner* — Max Noori
(74) *Attorney, Agent, or Firm* — Hartman Global IP Law; Gary M. Hartman; Domenica N. S. Hartman (57) ABSTRACT

Machines and methods capable of evaluating torque-tension and prevailing torque performance of prevailing-torque threaded fasteners. Such a machine may include one or more of the following features: a coordinated drive unit for achieving relative linear and rotational movement of a nut and bolt of a nut-bolt assembly; a sensor unit with multiple reaction torque sensors in series, wherein a lower-range torque sensor is protected from being overstressed while torque is transferred therethrough to a higher-range torque sensor; an optical temperature measurement unit oriented to detect a temperature at a thread interface of a nut and bolt through an opening in a device adapted to rotate the nut; and a bolt recess measurement unit that determines a bolt-through condition of a nut-bolt assembly by detecting a bolt recess of the nut-bolt assembly that has been assembled such that a prevailing torque feature thereof has been encountered.

19 Claims, 8 Drawing Sheets

(56) References Cited

U.S. PATENT DOCUMENTS

| | | |
|---|---|---|
| 5,339,696 A | 8/1994 | Carignan |
| 5,597,964 A | 1/1997 | Binns |
| 6,926,486 B1 * | 8/2005 | Kooser .................. B21D 51/32 |
| | | 413/1 |
| 2004/0129090 A1 | 7/2004 | Schoeps |
| 2008/0166200 A1 | 7/2008 | Hippensteele et al. |
| 2013/0085686 A1 | 4/2013 | Lee et al. |
| 2015/0021016 A1 | 1/2015 | Deng et al. |
| 2015/0330465 A1 * | 11/2015 | Shin ........................ F16D 65/16 |
| | | 188/162 |

* cited by examiner

MACHINES AND METHODS FOR EVALUATING PREVAILING TORQUE THREADED FASTENERS

CROSS REFERENCE TO RELATED APPLICATIONS

This application claims the benefit of U.S. Provisional Application No. 62/096,022, filed Dec. 23, 2014, the contents of which are incorporated herein by reference.

BACKGROUND OF THE INVENTION

The present invention generally relates to machines and methods capable of evaluating threaded fasteners. The invention particularly relates to machines and methods of performing torque-tension evaluations of prevailing-torque threaded fastener assemblies that comprise a locking feature, resulting in the fastener assembly exhibiting a prevailing torque during assembly.

The fastener industry has utilized various inspection procedures for qualifying prevailing-torque threaded fasteners. These procedures typically specify certain parameters of particular interest, including but not limited to drive torque, thread torque, prevailing torque, tension, etc. As used herein: "tension" will refer to the tensile loading of a threaded bolt caused by driving a threaded nut onto the bolt such that the bearing surfaces of the nut and bolt are drawn toward each other and the nut-bolt assembly generates a clamping load therebetween; "drive torque" will refer to the torsional resistance to assembling a threaded nut onto a threaded bolt, measured as the torque required to drive the nut onto the bolt and including the torque required to develop tension in the bolt as the bearing surfaces of the nut and bolt are drawn toward each other during assembly; "thread torque" will refer to the torsional resistance to assembling a threaded nut onto a threaded bolt, measured as the torque required to prevent the bolt head from rotating and including the torque required to develop tension in the bolt as the bearing surfaces of the nut and bolt are drawn toward each other during assembly; "final assembly torque" will refer to drive and/or thread torque; "prevailing torque" will refer to the torsional resistance to assembling a threaded nut onto a threaded bolt, measured as the torque required to prevent the bolt head from rotating while there is no tension in the bolt as the bearing surfaces of the nut and bolt are drawn toward each other during assembly or away from each other during disassembly; and "bolt-through" will refer to the condition during assembly of a threaded nut onto a threaded bolt at which the end of the bolt opposite its head and bearing surface is flush with the exit end of the nut (i.e., the end opposite the bearing surface of the nut).

Standard inspection procedures for qualification of some prevailing-torque threaded fasteners often impose various requirements on the above and other parameters. Some of these requirements and problems that may be encountered are briefly summarized below.

Standard inspection procedures sometime require the measurement of prevailing torque (measured before the nut-bolt assembly develops any clamping tension) and final assembly torque (measured when the nut-bolt assembly develops the final clamping tension). These procedures generally require stringent percent-of-point accuracy for both the prevailing torque measurements and the final assembly torque measurements. The ratio of the magnitude of prevailing and final assembly torque measurements can be 1:10 for a given nut-bolt assembly. It is also usually desirable that equipment used to perform torque measurements are capable of testing a range of fastener sizes and material strength grades, which may further necessitate a 1:10 ratio of torque measurements between the torque levels required for nut-bolt assemblies of the smallest size and/or lowest strengths relative to the torque levels required for nut-bolt assemblies of the largest size and/or highest strengths. It is difficult with a single sensor to economically and accurately measure torque over a range that, based on the foregoing, may encompass a torque ratio of 1:100.

Standard inspection procedures usually require that one member of a nut-bolt assembly is constrained from rotating with a constraining tool, while the other member is rotationally driven by a socket or other suitable drive tool. Due to the helical nature and geometry of screw threads, the relative rotation between the driven and constrained members of a nut-bolt assembly will cause relative linear motion between the members of the assembly as the members axially translate relative to each other. Unless the relative linear position of the drive tool and constrained member is accurately coordinated with their relative rotational position, there will be dragging (friction) forces and/or torques introduced into the nut-bolt assembly that can introduce errors into the test measurements. These forces can occur if the driven member is able to slide within or otherwise shift relative to the drive tool, the constrained member is able to slide within or otherwise shift relative to the constraining tool, or the drive tool rubs the bearing surface of the constrained member. In addition, if the relative linear position of the drive tool and constrained member is not coordinated with their relative rotational position, it may be necessary for the constraining tool or drive tool to be deep enough to accommodate the change in the relative linear position between the members of the nut-bolt assembly.

Standard inspection procedures may also require the measurement of temperature at the thread interface of a nut-bolt assembly to ensure that the temperature remains within a prescribed allowance from room temperature. One way to monitor this temperature is to continuously observe the thread temperature where the bolt thread exits the nut with the use of an optical measurement instrument. However, because the linear distance between the bearing surfaces of the bolt and nut changes as the nut-bolt assembly is driven rotationally to assemble or disassemble, a "moving target" is presented to the optical measurement instrument unless steps are taken to continuously adjust the aim of the instrument or to fix the targeted bolt thread where it exits the nut. Another obstacle is that the nut is usually constrained or driven by a socket, which often completely envelopes the nut including the targeted bolt thread where it exits the nut, obscuring the bolt thread from optical temperature measurement.

Standard inspection procedures also sometimes require that torque measurements are summarized and recorded at defined intervals during a test. Some of those intervals are defined relative to the bolt-through position where the end of the bolt opposite its head is flush with the exit end of the nut (the surface opposite its bearing surface), often taken as when the bolt starts to protrude from the exit end the nut. Observing a bolt-through event in real-time is problematic because the tool or adapter that constrains or drives the nut often completely obscures the event if simple measurement or detection methods are used.

BRIEF DESCRIPTION OF THE INVENTION

The present invention provides machines and methods capable of evaluating the torque-tension and prevailing torque performance of prevailing-torque threaded fasteners, and particularly nut-bolt assemblies.

According to certain aspects of the invention, a machine for evaluating a prevailing-torque threaded nut-bolt assembly may include one or more of the following features: a coordinated drive unit for achieving relative linear and rotational movement of a nut and bolt of the nut-bolt assembly; a sensor unit comprising multiple reaction torque sensors in series, wherein a lower-range torque sensor is protected from being overstressed while torque is transferred therethrough to a higher-range torque sensor; means for rotating a nut, wherein at least one opening is defined therein and an optical temperature measurement unit is oriented to detect a temperature at a thread interface of the nut and bolt through the opening; and/or a bolt recess measurement unit that determines a bolt-through condition of the nut-bolt assembly by detecting a bolt recess of the nut-bolt assembly that has been assembled such that a prevailing torque feature thereof has been encountered.

Other aspects and advantages of this invention will be appreciated from the following detailed description.

DETAILED DESCRIPTION OF THE INVENTION

Figure 1:
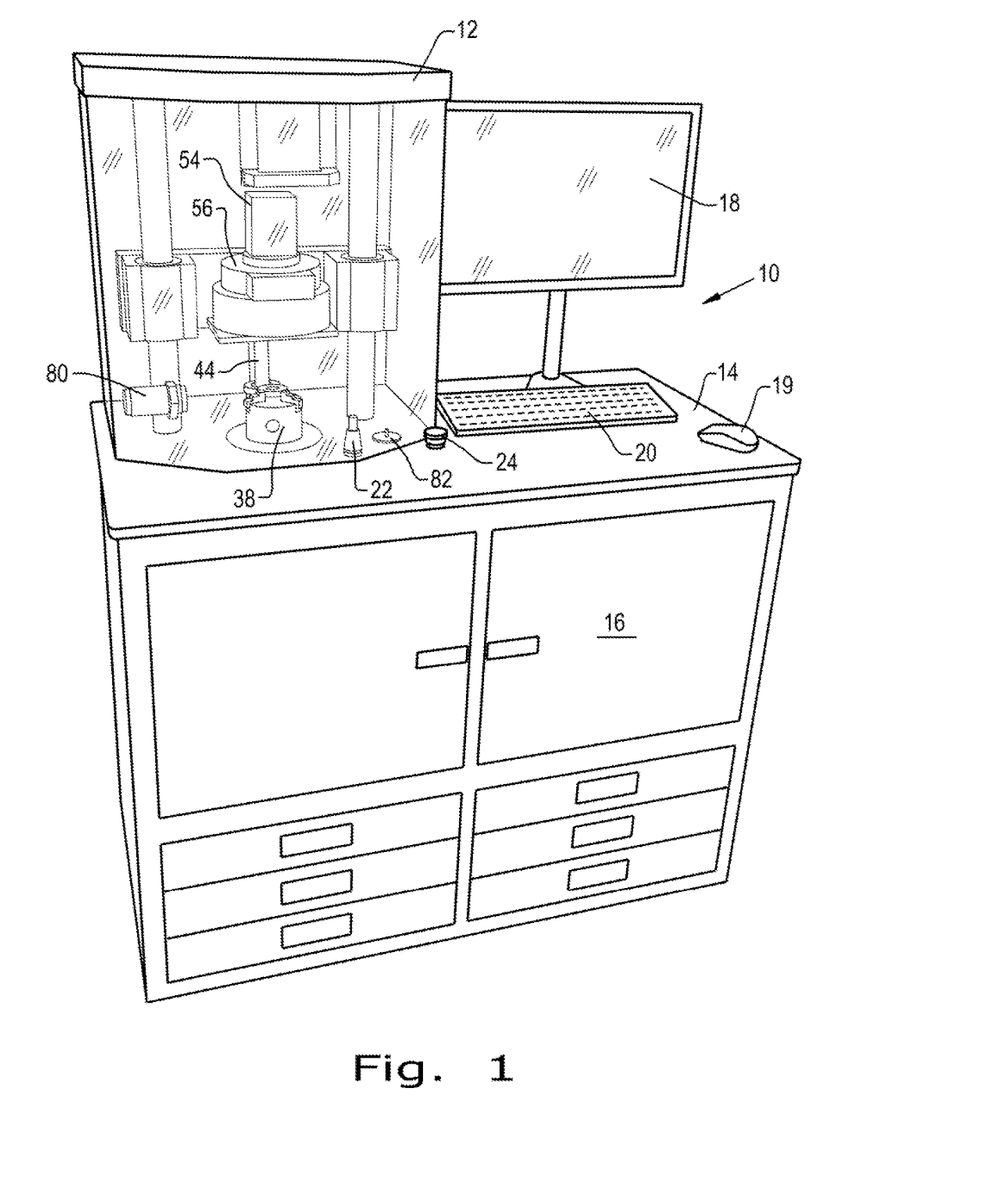
FIG. 1 shows a machine capable of evaluating a prevailing-torque threaded fastener in accordance with nonlimiting embodiments of the invention.

FIG. 1 depicts a machine adapted to measure torque and tension characteristics of a prevailing-torque threaded nut-bolt assembly, and FIGS. 2 through 6 depict certain components of the machine 10. The machine 10 is preferably compatible with automatic torque-tension and prevailing torque qualification test processes of types by which fastener lots are evaluated. The nonlimiting embodiment of the machine 10 shown in FIG. 1 is particularly configured as a torque-tension test machine suitable for automatic testing of the prevailing torque and torque-tension characteristics of a nut-bolt assembly in which the nut is a locknut, and therefore has a locking feature (element) that results in the nut exhibiting a prevailing torque during assembly and disassembly with a bolt.

Figure 7:
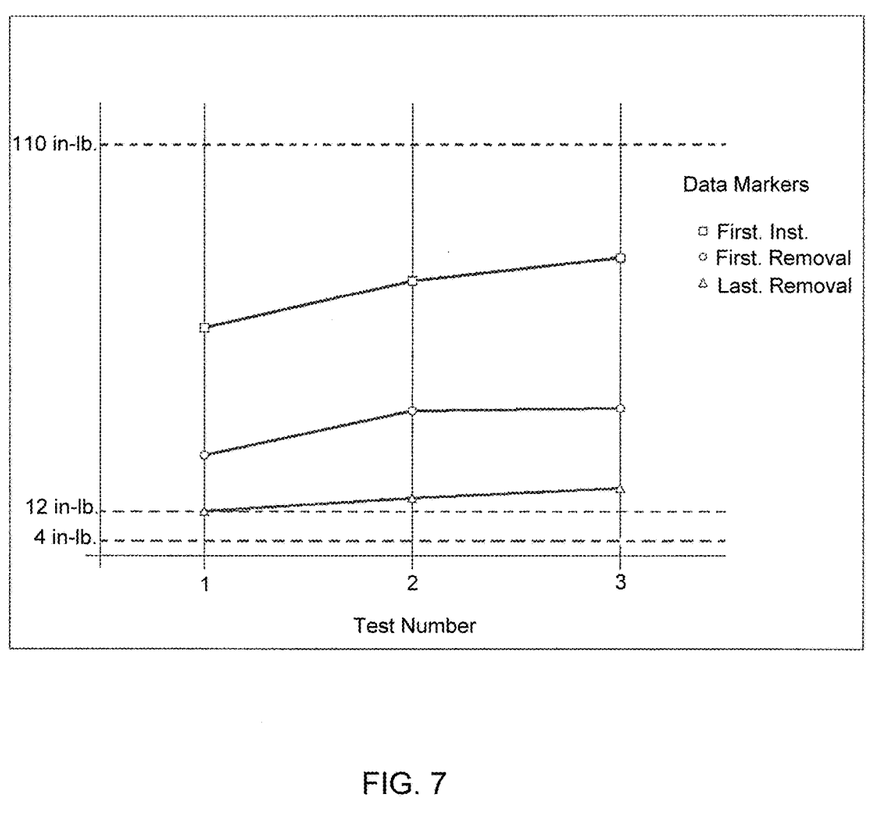
FIG. 7 shows a summary graph representative of torque data obtained from tests performed on three samples with the machine of FIG. 1.
Figure 8:
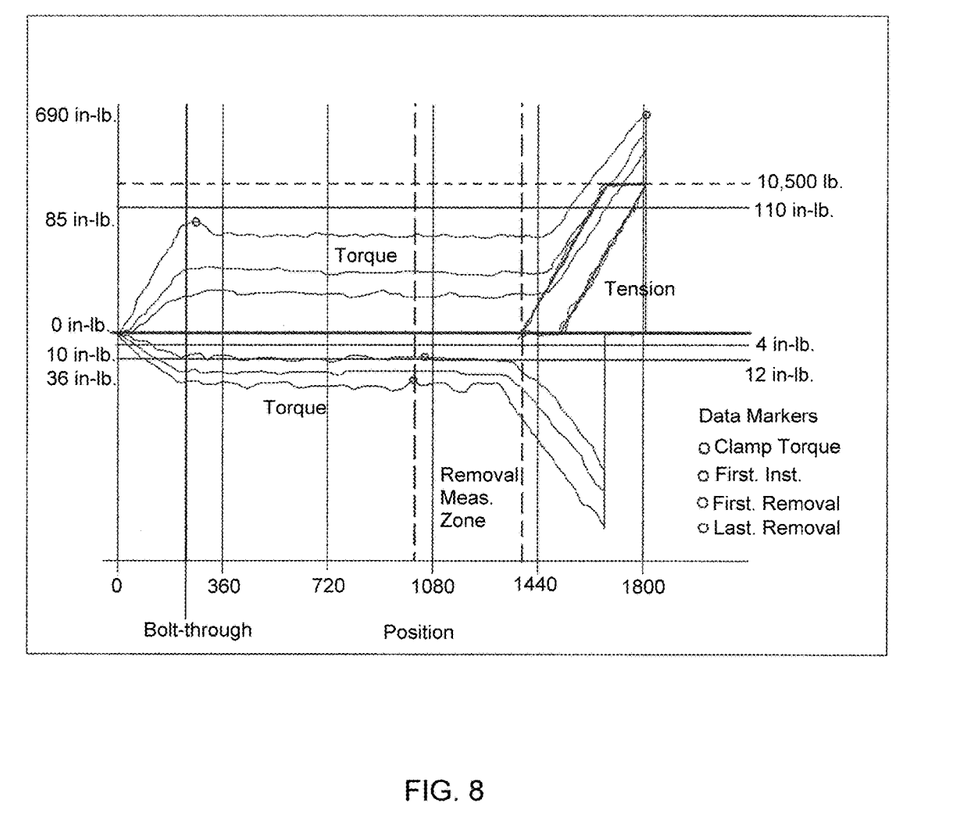
FIG. 8 shows a detail graph representative of torque data that may be obtained during a test performed on a sample with the machine of FIG. 1.

As seen in FIG. 1, the machine 10 comprises an enclosure 12 situated on a counter top 14 of a cabinet 16, and certain components of the machine 10 enclosed within the enclosure 12. The machine 10 can be seen as further including a monitor 18, computer mouse 19, keyboard 20, joystick 22, and emergency stop button 24 as user interface devices with which a user can control the machine 10 and its operation. The joystick 22 can be used to manually control the operation of the machine 10 while the enclosure 12 is open, and in particular the manual (jog) operation of rotary and linear actuators 26 and 28 that are part of a coordinated drive unit 30 (FIG. 2) of the machine 10. Opening the enclosure 12 preferably inhibits automatic operation of the drive unit 30, and activating the emergency stop button 24 preferably inhibits all operation of the drive unit 30. Certain components of the machine 10 may be enclosed within the cabinet 16, including control, processing and data storage equipment that preferably form part of a computing system associated with the machine 10. The computing system may use a standard personal computer and use a Windows7 operating system and custom programs for controlling the machine 10 and processing and storing data. Additional components of the machine 10 that may be enclosed within the cabinet 16 include the aforementioned rotary and linear actuators 26 and 28, a drive torque sensor, rotational (angular) position sensor 46, translational (linear) position sensor 48, and controller 50, discussed in further detail below. The computing system may communicate via an intranet, for example, to automatically retrieve testing schedules and requirements data, automatically record and store test data, etc. The machine 10 and its computing system are preferably, though not necessarily, equipped to perform tests during which the following measurements are recorded continuously or at predetermined update periods: angular position of one or more components of a nut-bolt assembly, bolt-through condition, total torque, thread torque, clamp load, and temperature. FIGS. 7 and 8 show graphs that are representative of data that may be obtained with the machine 10 of FIG. 1.

Figure 2:
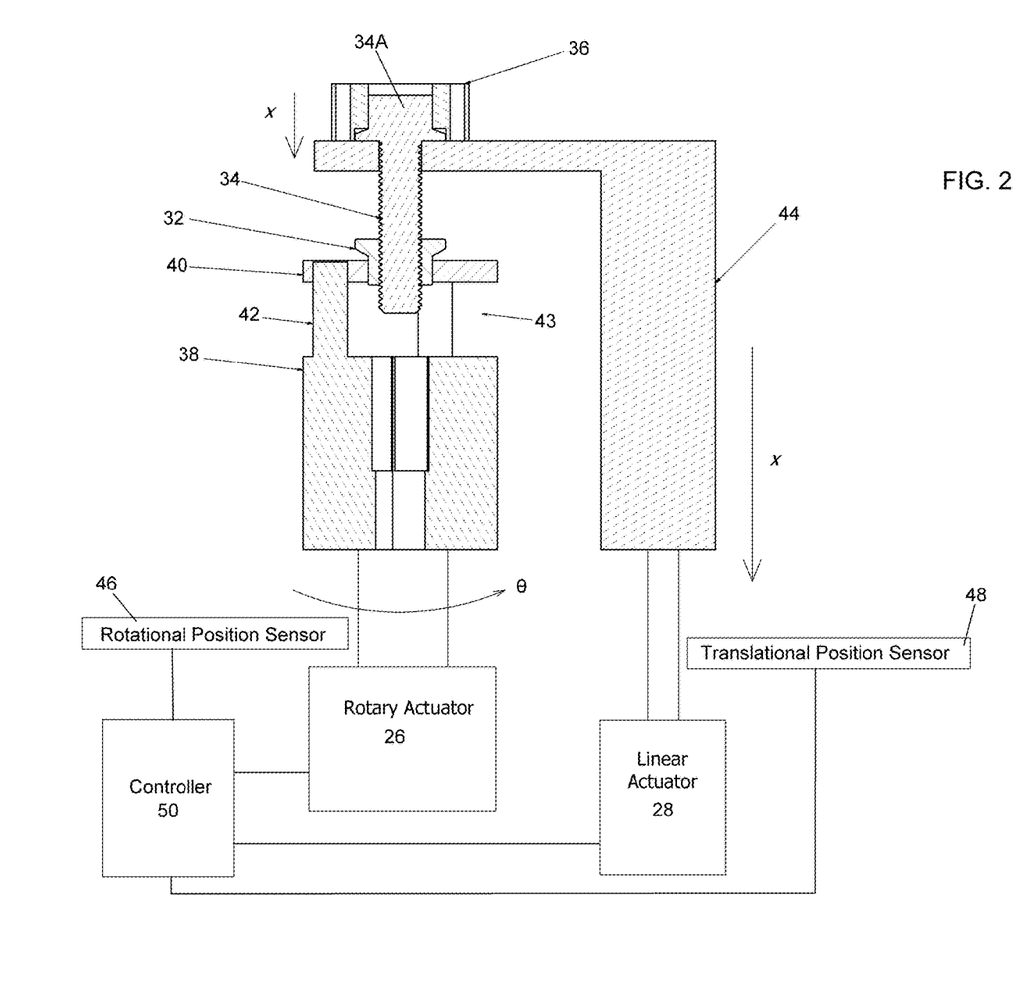
FIG. 2 schematically represents a unit of the machine of FIG. 1 that provides coordinated relative linear and rotational movement of two members of a threaded nut-bolt assembly.

FIG. 2 represents the coordinated drive unit 30 of the machine 10 that provides coordinated relative linear and rotational movement of two members (a nut 32 and a bolt 34) of a threaded nut-bolt assembly. The drive unit 30 includes the linear actuator 28 employed as an axial drive to position (raise/lower) a constraining tool 36 that is coupled to the head 34A of the bolt 34 and adapted to prevent rotation of the bolt 34 about the thread axis of the nut-bolt assembly. The drive unit 30 further includes the rotary actuator 26 employed as a torsional drive to rotate the nut 32. The rate at which the constraining tool 36 is raised or lowered by the linear actuator 28 is assigned by the computing system according to the rotational speed and direction of the rotary actuator 26 and the pitch and handedness (left or right) of the threads of the nut-bolt assembly. The result of this coordinated translation of the bolt 34 and rotation of the nut 32 fixes the apparent axial location of the nut 32, while not directly constraining it to that axial location. Though the machine 10 is shown in FIG. 1 as having the axis of the nut-bolt assembly oriented in the vertical direction, it is within the scope of the invention that the axis of the nut-bolt assembly could be oriented in any direction.

In the nonlimiting embodiment of the drive unit 30 shown in FIG. 2, a member 38 is constrained from translating in all axes, and is rotationally driven by the rotary actuator 26 about the thread axis of the nut-bolt assembly to install or remove the nut 32 from the bolt 34. The configurations of the member 38 and the shaft coupling the member 38 to the rotary actuator 26 in FIG. 2 are for illustrative purposes only, and it is foreseeable that measures could be taken to reduce the mass of each to reduce their moments of inertia. A constraining member 40 is rigidly attached with circumferentially-spaced posts 42 to the member 38, such that there can be no relative rotation between the members 38 and 40. The constraining member 40 accepts the nut 32 such that there can be no relative rotation between the member 40 and the nut 32. The nut 32 is not required to be axially constrained by the member 40. In combination, the actuator 26, members 38 and 40, and posts 42 serve as means adapted to cause rotational movement of the nut 32 about its axis of rotation. FIG. 2 further shows a member 44 constrained from rotating in all axes, and linearly driven by the linear actuator 28 in parallel with the thread axis of the nut-bolt assembly. The bolt 34 is fixed relative to the member 44 by the constraining tool 36 (which in combination are adapted to serve as means for constraining rotational movement of the bolt 34), and therefore moves linearly with member 44 (which in combination with the actuator 28 is adapted to serve as means for causing linear movement of the bolt 34).

The operations of the rotary and linear actuators 26 and 28 are shown in FIG. 2 as being controlled with the controller 50 using feedback from the rotational and translational position sensors 46 and 48, which in combination are adapted to serve as means for coordinating the linear movement of the bolt 34 with the rotational movement of the nut 32 so that linear movement of the nut 32 does not occur. The computing system and the controller 50 in particular can coordinate the respective rotational and translational motions of the rotary actuator 26 and linear actuator 28 according to the equation $$x = \theta * P$$

where x is the linear distance that the members 34, 36 and 44 move, θ is the angular distance (e.g., revolutions) that the members 38, 40 and 32 are rotated, and P is the pitch of the threads in units of length/distance per thread or full revolution (angle). For example, if the pitch P is 0.05 inches and the angle θ is 5 revolutions, the translation distance x is 5*0.05=0.25 inches. If the coordination of the rotational and translational motions of the nut 32 and bolt 34 is continuous, the nut 32 appears fixed along the axis of the threads as the rotary actuator 26 acts to install and remove the nut 32 from the bolt 34.

Figure 3:
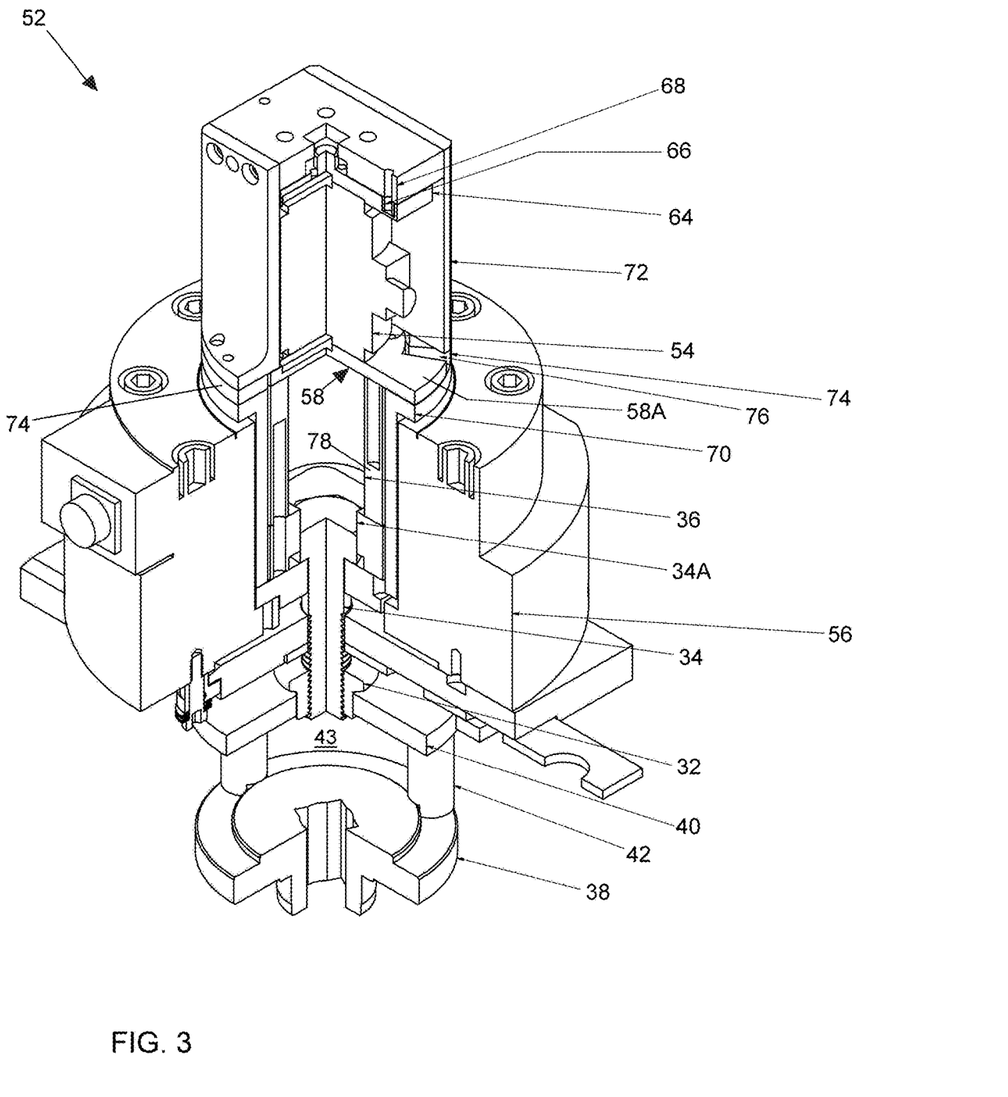
FIG. 3 represents a partial sectional view of a reaction torque sensor unit of the machine of FIG. 1
Figures 4A, 4B:
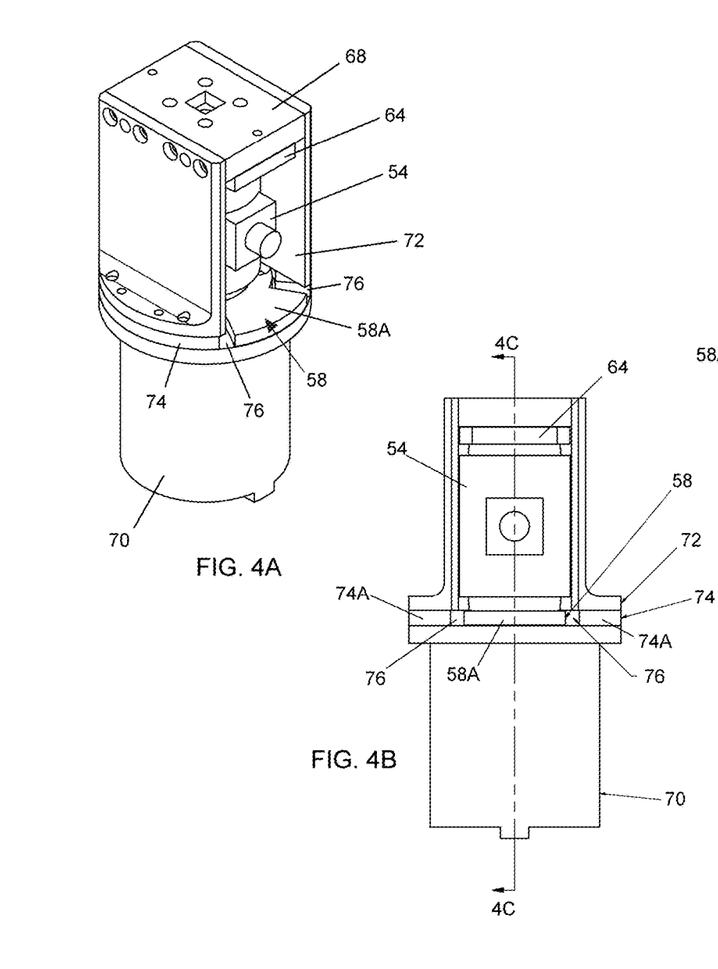
FIGS. 4A and 4B represent, respectively, perspective and side views of a portion of the reaction torque sensor unit of FIG. 3.
Figure 4C:
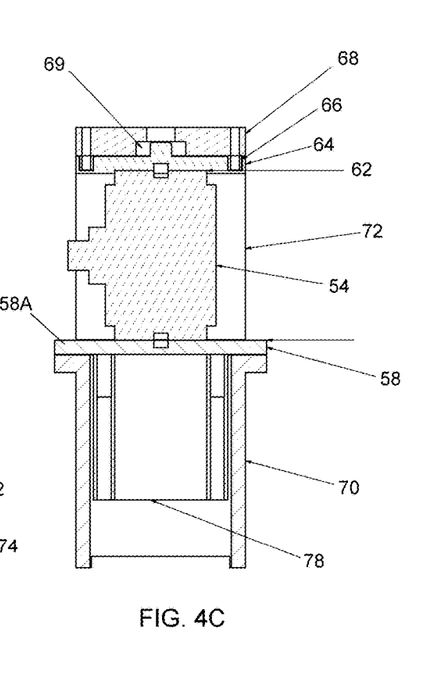
FIG. 4C represents a cross-sectional view taken along section line 4C-4C of FIG. 4B.

FIG. 3 represents a torque sensor unit 52 of the machine 10, and FIGS. 4A, 4B, and 4C represent several views of a portion of the sensor unit 52. The torque sensor unit 52 addresses the difficulty of economically and accurately measuring torque over a wide range, for example, encompassing a torque ratio of 1:100, by utilizing multiple reaction torque sensors in series. One reaction torque sensor 54 shown in FIG. 3 is preferably capable of accurately measuring torque in a first measurement range. At least one other reaction torque sensor 56 shown in FIG. 3 is preferably capable of accurately measuring torque in a higher measurement range. The lower and higher ranges are selected to overlap such that the accuracy of the measurements at the minimum of the measurement range for the higher-range torque sensor 56 is sufficient at the maximum of the measurement range for the lower-range torque sensor 54. Such a capability is provided by protecting the lower-range torque sensor 54 from being overstressed while the torque being sensed is still otherwise transferred through the sensor unit 52 to the higher-range torque sensor 56.

The sensor unit 52 represented in FIGS. 3 and 4 preferably allows measurement of torque from zero torque up to a defined saturation torque level of the lower-range torque sensor 54. Ideally this saturation torque level is between the upper extent of the specified measurement range of the lower-range torque sensor 54 and the specified overload level of the lower-range torque sensor 54.

In the nonlimiting embodiment of the sensor unit 52 shown in FIGS. 3 and 4, the members 38 and 40 are rigid and fixed to each other through the posts 42, and transmit prevailing torque to the nut 32. The bolt 34 is assembled (threaded) into the nut 32. During assembly, the nut 32 transmits prevailing torque to the bolt 34. The bolt 34 is rotationally constrained to the constraining tool 36. The constraining tool 36 is rigidly fixed to a member 58, which is rigidly fixed to the lower-range torque sensor 54 at a sensor input plane 60 (FIG. 4C). Input torque is transferred through the bolt head 34A, the constraining tool 36, and member 58 to the lower-range torque sensor 54 via the input plane 60 of the sensor 54. Torque is transferred through the lower-range torque sensor 54 through a sensor output plane 62 to a rigid member 64, and then through a rotationally flexible member 66 to a rigid member 68, to which the rigid member 64 is further connected with a bearing 69 to preserve the axial alignment of the unit 52 under torsional load. The rigid member 68 is rigidly connected to a rigid member 70 through rigid members 72 and 74. The rigid member 70 serves as the output of that portion of the sensor unit 52 that is represented in FIGS. 4A, 4B and 4C, and is shown coupled with the higher-range torque sensor 56 in FIG. 3. The thread torque sensed at the head 34A of the bolt 34 is transferred to the lower-range torque sensor 54 through the bolt head 34A, the constraining tool 36, and member 58. Under this torsional load, the flexible member 66 allows the lower-range torque sensor 54 and member 64 to rotationally flex relative to the member 68, the extent of which is limited by two gaps 76, each between a portion 58A of the member 58 nested or disposed between portions 74A (FIG. 4B) of the member 74. As torque increases from zero but while still lower than the saturation torque level of the lower-range torque sensor 54, the torsional load is entirely transferred through the bolt head 34A, constraining tool 36, and the member 58 to the lower-range torque sensor 54, and then through the members 64, 66, 68, 72, 74, and 70 to the higher range torque sensor 56. If torque continues to increase to a level at or above the saturation torque level of the lower-range torque sensor 54, the member 58 sufficiently rotates relative to the rigidly-interconnected members 68, 72 and 74 so that one of the gaps 76 between the members 58 and 74 (depending on the direction of rotation) is closed and the portion 58A of the member 58 comes in contact with one of the portions 74A of the member 74, with the result that torsional loads up to the saturation torque level are transferred through the bolt head 34A, constraining tool 36, member 58, the lower-range torque sensor 54, and then members 64, 66, 68, 72, 74, and 70 to the higher range torque sensor 56, whereas torsional levels above the saturation torque level are solely transferred to the higher range torque sensor 56 through the bolt head 34A, constraining tool 36, and members 58, 74, and 70, bypassing the lower range torque sensor 54 and members 64, 66, 68, and 72.

In view of the above, torque up to the saturation level of the lower-range torque sensor 54 is transferred through the lower-range torque sensor 54 to the higher range torque sensor of the sensor unit 52 prior to the gap 76 closing, and torque in excess of the saturation level is transferred through the sensor unit 52 to the higher range torque sensor in parallel to but bypassing the lower-range torque sensor 54 after the gap 76 closes. In this manner, though the deflection and measurement of the lower-range torque sensor 54 are mechanically limited, the sensor unit 52 can transfer torque in excess of the saturation limit of the lower-range torque sensor 54, during which time the lower-range torque sensor 54 only experiences and reports the saturation torque value. Logic in the computing system used to perform the data analysis can recognize the limitation of the lower-range torque sensor 54 and use the higher-range torque sensor 56 reading above the measurement range of the lower-range torque sensor 54.

In view of the above, a benefit of the sensor unit 52 is that torque levels below the saturation torque of the lower-range torque sensor 54 can be accurately measured with the lower-range torque sensor 54, and torque levels above the saturation torque are transferred around the lower-range torque sensor 54 to prevent overstress and damage to the lower-range torque sensor 54. Furthermore, two torque sensors in series (one lower-range and one higher-range) can be used to accurately test a large range of fastener sizes and materials, where traditionally several sensors would otherwise be required and used one at a time. This sensors-in-series arrangement eliminates the requirement to acquire and maintain (including periodic calibration verification) numerous sensors, each having a unique range, and the need to swap the sensors in and out of the test equipment whenever a test would otherwise be out of the installed sensors accurate range.

Figure 5A:
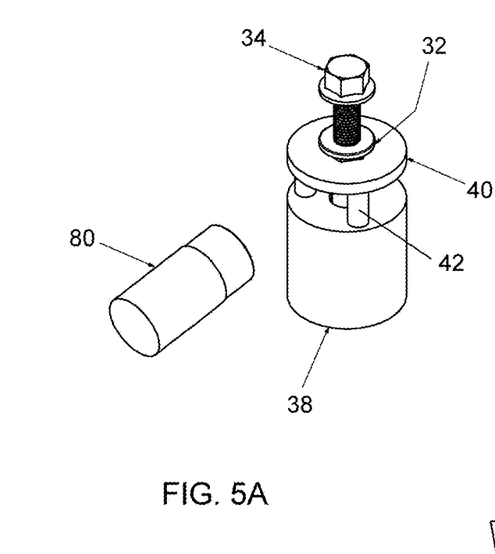
FIGS. 5A and 5B represent, respectively, perspective and cross-sectional views of an optical temperature measurement unit of the machine of FIG. 1.
Figure 5B:
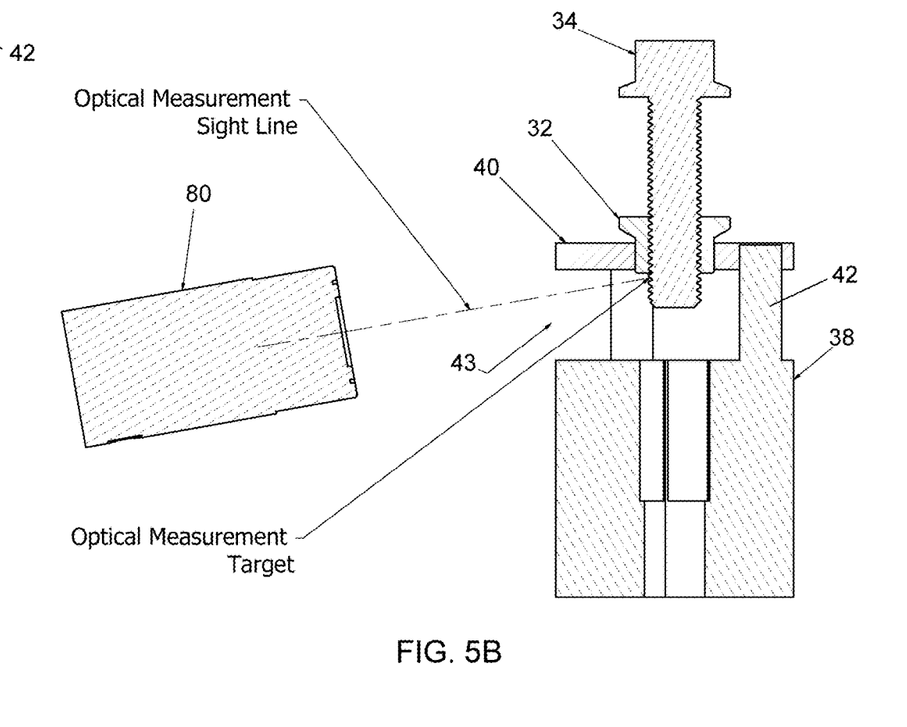

FIGS. 5A and 5B represents an optical temperature measurement unit of the machine 10. The temperature measurement unit is used to monitor heat generated at the nut-bolt thread interface due to a significant portion of the work imparted on the nut-bolt assembly being converted to heat, causing a temperature rise during assembly and disassembly. The temperature measurement unit exploits aspects of the coordinated drive unit 30 shown in FIG. 2, which ensures that the nut 32 does not axially translate during its installation on the bolt 34 as a result of the position of the bolt 34 being controlled and coordinated with the thread pitch and rotation of the nut 32. As a result, temperature can be measured at a stationary point where the threads of the bolt 34 exit the nut 32 because the nut 32 can remain fixed relative to an optical temperature measurement instrument 80 mounted in proximity to the nut-bolt assembly under test. The instrument 80 can be aimed and, if properly fixtured, will remain on-target for all subsequent assembly and disassembly cycles of a given inspection procedure. Because different platings and coatings commonly used on fasteners will have different emissivity properties, the instrument 80 is preferably capable of being calibrated for the particular finish of the bolt threads.

Another obstacle to obtaining accurate temperature measurements and avoided with the coordinated drive unit 30 is achieved with the constraining member 40. In the nonlimiting embodiment represented in the drawings, the constraining member 40 is shown as a disk that is oriented perpendicular to the axis of rotation of the nut 32, is not thicker than the height of the nut 32, and is axially positioned relative to the nut 32 such that the constraining member 40 does not obscure the optical temperature measurement instrument 80 from the target at the nut-bolt interface, represented in FIG. 5B as a surface of the bolt 34 at or in close proximity to the exit end of the nut 32. In addition, the constraining member 40 is driven by the member 38, which does not continuously obscure the measurement instrument 80 from the target. In the nonlimiting embodiment shown in FIGS. 2, 3, 5A and 5B, two or more posts 42 can be circumferentially-spaced about the axis of rotation to transfer the drive torque to the constraining member 40 and nut 32. The posts 42 define relatively large openings or windows 43 therebetween. Though optical observation of the target is momentarily obscured each time one of the posts 42 passes between the measurement instrument 80 and its target, this momentary obstruction is predictable and/or detectable, and the observed temperature during the passage of a post 42 can be filtered accordingly. The momentary obstructions generally cause a cooler temperature observation than the target=s temperature. The observed measurements can be filtered by selecting local temperature maxima, which would not include the cooler measurements of the posts 42.

The constraining member 40 has a hole through its center that is coaxial with the axis of rotation of the nut 32 and is sized and shaped such that it will drive the nut 32 with sufficient torque to accomplish the goals of a test procedure without relative rotation between the constraining member 40 and nut 32. The hole in the constraining member 40 has a size and shape that is suitable for coupling with the peripheral shape of the nut 32, for example, a rectangular or hexagonal shape for use with a hexagonal-shaped nut 32.

Torque tests of prevailing-torque fasteners often use the bolt-through condition as a reference point to define intervals at which subsequent torque measurements are summarized and recorded. A "bolt-through" condition occurs during the assembly of a nut and bolt when the end of the bolt opposite its head is flush with the exit end of the nut (the surface opposite its bearing surface). The bolt-through condition is often taken as occurring when the bolt starts to protrude from the exit end the nut.

A common characteristic of prevailing-torque fasteners is that they are usually required to be assemblable by hand for a minimum amount prior to encountering a prevailing torque feature (element) of the fastener assembly. Disassembling and reassembling a nut-bolt assembly to this encounter point is sufficiently repeatable, such that if the nut and bolt are assembled to the encounter point and the distance is measured between the exit end of the nut and the end of the bolt opposite its head (referred to herein as the bolt recess or negative protrusion), the nut and bolt can be disassembled and then reassembled and reliably returned to the encounter point at which the bolt recess was measured. Using this characteristic and the knowledge of the thread pitch (distance per revolution/thread) of a nut-bolt assembly, by monitoring the angular position (rotations) of the nut 32 (for example, with the aforementioned rotational position sensor 46 (FIG. 2) and performing a pre-test measurement of the bolt recess at the start of a test, the instant of the bolt-through condition can be predicted accurately and in real-time without needing to be measured or detected directly.

Figure 6:
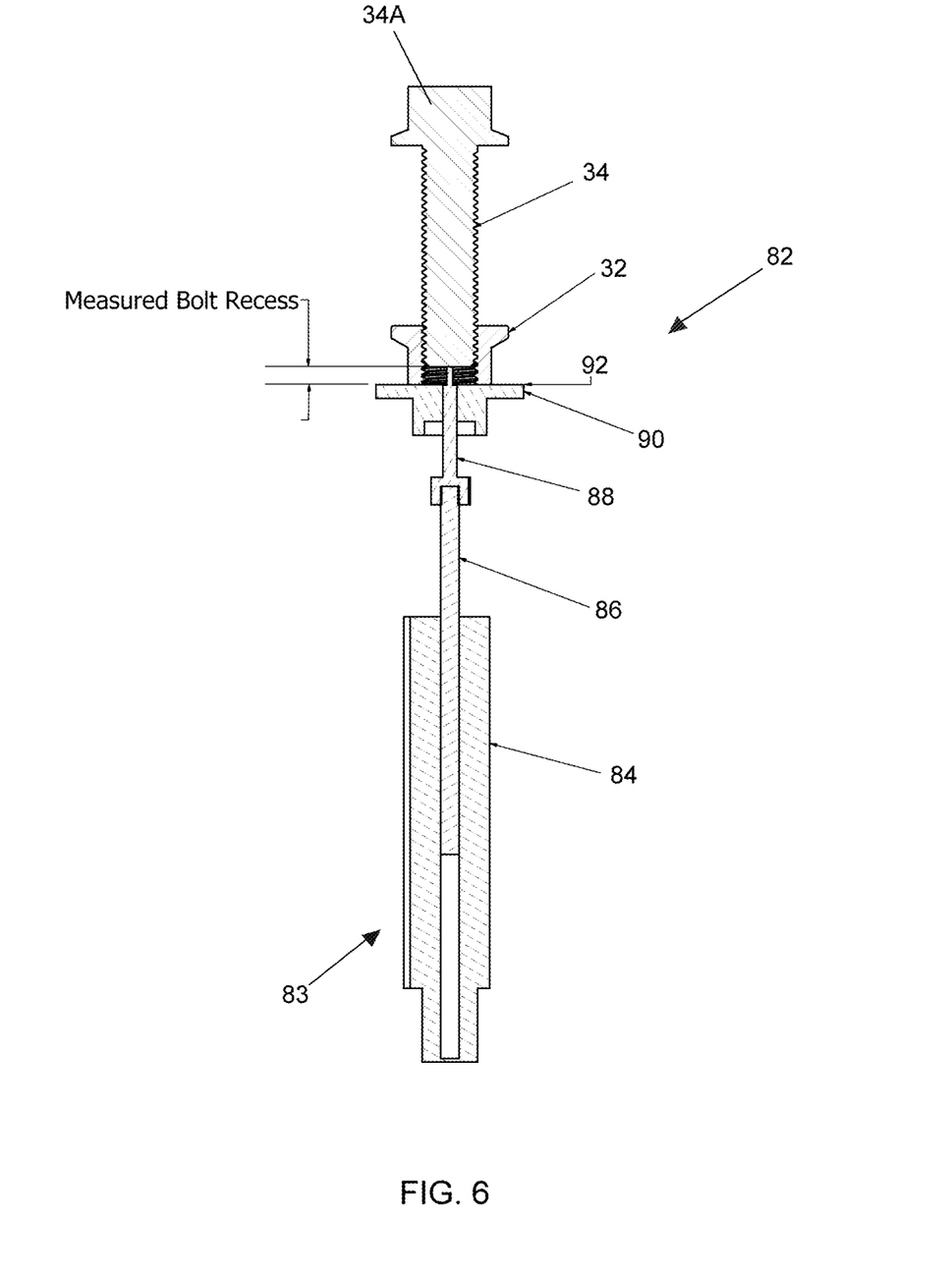
FIG. 6 represents a cross-sectional view a bolt recess measurement unit of the machine of FIG. 1.

For this purpose, FIG. 6 represents a bolt recess measurement unit 82 that employs a linear transducer (linear potentiometer) 83 to measure the distance between the end of the bolt 34 opposite its head 34A and the exit end of the nut 32. For a nut-bolt assembly in which the nut 32 is a prevailing-torque locknut and the bolt 34 is a standard test bolt, the two components can be assembled together (usually by hand) to the point where the prevailing-torque feature of the nut 32 is first encountered by the threads of the bolt 34. The linear transducer 83 of FIG. 6 is represented as a spring-loaded linear distance transducer having a body 84 and rod 86. A probe 88 is coupled to the rod 86 and protrudes through a collar 90 and through a reference plane 92 defined by a surface of the collar 90. The nut-bolt assembly 32-34 is positioned on the collar 90 so that the end of the probe 88 contacts the end of the bolt 34 and the spring load of the transducer 83 is overcome such that the exit end of the nut 32 contacts the surface of the collar 90 that defines the reference plane 92. The length of the probe 88 between the reference surface 92 and the end of the bolt 34 corresponds to the bolt recess of the nut-bolt assembly. The transducer 83 can be calibrated such that its output value is zero when the end of the probe 88 is even with the reference surface 92, such that when the transducer 83 is assembled with a nut-bolt assembly having a known recess, the measurement obtained from the transducer 83 corresponds to the known recess. As represented in FIG. 1, the bolt recess measurement unit 82 can be mounted in the counter top 14 and within the enclosure 12 of the machine 10 to facilitate performing a bolt recess measurement prior to a torque tension test. As shown in FIG. 1, only the probe 88 and surrounding collar 90 need be exposed to perform a bolt recess measurement, with the remainder of the unit 82 located within the cabinet 16. The assembly of the nut 32 and the bolt 34 can be disassembled after the measurement of bolt recess and then reassembled into the constraining tool 36 and member 40 of the torque tension test apparatus for the torque tension test. Reassembly of nut 32 and bolt 34 to the same position from which bolt recess was measured is generally repeatable to the accuracy required of the test.

The bolt recess measured by the measurement unit 82 can be divided by the thread pitch (distance per revolution/thread) of the nut-bolt assembly to determine the number of revolutions required for the nut 32 to travel the axial distance from the measured bolt recess position to the bolt-through condition. The test is performed, recognizing that the determined number of revolutions to the bolt-through condition can also be used to establish intervals at which torque measurements can be subsequently obtained, summarized and reported during testing of a nut-bolt assembly. Determination of the bolt-through condition can be performed automatically with appropriate test execution software based on the thread pitch of the nut-bolt assembly and measured bolt recess serving as input parameters of the test.

While the invention has been described in terms of specific nonlimiting embodiments, it is apparent that other forms could be adopted by one skilled in the art. For example, the machine 10 and its subsystems could differ in appearance and construction from the embodiments shown in the Figures, the functions of each component of the machine 10 and subsystems could be performed by components of different construction but capable of a similar (though not necessarily equivalent) function, and various processing and materials could be substituted for those noted. Accordingly, it should be understood that the invention is not limited to the specific nonlimiting embodiments illustrated in the Figures. It should also be understood that the phraseology and terminology employed above are for the purpose of disclosing the illustrated embodiments, and do not necessarily serve as limitations to the scope of the invention. Therefore, the scope of the invention is to be limited only by the following claims.

The invention claimed is:

1. A machine for evaluating a prevailing-torque threaded nut-bolt assembly, the machine comprising a coordinated drive unit for achieving relative linear and rotational movement of a nut and bolt of the nut-bolt assembly, the coordinated drive unit comprising:
   means for constraining rotational movement of the bolt;
   means for causing linear movement of the bolt;
   means for causing rotational movement of the nut about an axis of rotation thereof; and
   means for coordinating the linear movement of the bolt with the rotational movement of the nut so that linear movement of the nut does not occur.

2. The machine of claim 1, wherein the coordinating means comprises a controller, a translational position sensor that senses the linear movement of the bolt, and a rotational position sensor that senses the rotational movement of the nut, wherein the controller controls the means for causing linear movement of the bolt and the means for causing rotational movement of the nut using feedback from the translational position sensor and the rotational position sensor.

3. The machine of claim 1, further comprising a sensor unit that includes at least first and second reaction torque sensors in series, the first reaction torque sensor being adapted to measure torque in a first measurement range and the second reaction torque sensor being adapted to measure torque in a higher measurement range that overlaps the first measurement range, the first reaction torque sensor being protected from being overstressed when the sensor unit is subjected to a torque level within the higher measurement range by means for transferring the torque being sensed through the sensor unit to the second reaction torque sensor while subjecting the first reaction torque sensor to torque within the first measurement range but not within the higher measurement range.

4. The machine of claim 3, wherein the transferring means comprises:
   a rotationally flexible member that interconnects the first and second reaction torque sensors; and
   a closable gap that closes from rotational motion of the first reaction torque sensor relative to the second reaction torque sensor to transfer the torque to the second reaction torque sensor, wherein the gap is closed at the torque level within the higher measurement range.

5. The machine of claim 4, wherein the transferring means further comprises:
   a first rigid member that rigidly interconnects the first reaction torque sensor to the means for constraining rotational movement of the bolt;
   a second rigid member that rigidly interconnects the first reaction torque sensor to the rotationally flexible member; and
   a third rigid member that rigidly interconnects the rotationally flexible member to the second reaction torque sensor;
   wherein the closable gap is between portions of the first and third rigid members.

6. The machine of claim 1, further comprising:
   at least one opening defined by the means for causing rotational movement of the nut; and
   an optical temperature measurement unit oriented to detect a temperature at a thread interface of the nut and bolt through the opening.

7. The machine of claim 6, wherein the thread interface of the nut and bolt is a surface of the bolt at an exit end of the nut.

8. The machine of claim 6, wherein the at least one opening comprises multiple openings between posts that are circumferentially-spaced about the axis of rotation of the nut and connect the means for causing rotational movement of the nut to a member having a hole in which the nut is received.

9. The machine of claim 1, further comprising a bolt recess measurement unit that determines a bolt-through condition of the nut-bolt assembly by detecting a bolt recess of the nut-bolt assembly following assembly of the nut and bolt until a prevailing torque feature thereof is encountered.

10. The machine of claim 9, wherein the bolt recess measurement unit comprises a linear transducer disposed in a central opening of the means for causing rotational movement of the nut.

11. A method of evaluating the prevailing-torque threaded nut-bolt assembly with the machine of claim 1, the method comprising:
constraining the rotational movement of the bolt;
linearly moving the bolt;
rotating the nut; and
coordinating the linear movement of the bolt with the rotational movement of the nut so that linear movement of the nut does not occur.

12. A machine for evaluating a prevailing-torque threaded nut-bolt assembly, the machine comprising a sensor unit that includes at least first and second reaction torque sensors in series, the first reaction torque sensor being adapted to measure torque in a first measurement range and the second reaction torque sensor being adapted to measure torque in a higher measurement range that overlaps the first measurement range, the first reaction torque sensor being protected from being overstressed when the sensor unit is subjected to a torque level within the higher measurement range by transferring the torque being sensed through the sensor unit to the second reaction torque sensor while subjecting the first reaction torque sensor to torque within the first measurement range but not within the higher measurement range.

13. The machine of claim 12, wherein the sensor unit comprises:
a rotationally flexible member that interconnects the first and second reaction torque sensors; and
a closable gap that closes from rotational motion of the first reaction torque sensor relative to the second reaction torque sensor to transfer the torque to the second reaction torque sensor.

14. A method of evaluating a prevailing-torque threaded nut-bolt assembly with the machine of claim 12, the method comprising protecting the first reaction torque sensor from being overstressed when the sensor unit is subjected to a torque level within the higher measurement range by transferring the torque being sensed through the sensor unit to the second reaction torque sensor while subjecting the first reaction torque sensor to torque within the first measurement range but not within the higher measurement range.

15. A machine for evaluating a prevailing-torque threaded nut-bolt assembly, the machine comprising:
a coordinated drive unit for achieving relative linear and rotational movement of a nut and bolt of the nut-bolt assembly, the coordinated drive unit comprising means for constraining rotational movement of the bolt, means for causing linear movement of the bolt, means for rotating the nut, and means for coordinating the linear movement of the bolt with the rotational movement of the nut so that linear movement of the nut does not occur;
at least one opening defined by the means for rotating the nut; and
an optical temperature measurement unit oriented to detect a temperature at a thread interface of the nut and bolt through the opening.

16. A method of evaluating a prevailing-torque threaded nut-bolt assembly with the machine of claim 15, the method comprising using the optical temperature measurement unit to detect the temperature at the thread interface of the nut and bolt through the opening.

17. A machine for evaluating a prevailing-torque threaded nut-bolt assembly, the machine comprising a bolt recess measurement unit that determines a bolt-through condition of the nut-bolt assembly by detecting a bolt recess of the nut-bolt assembly following assembly of the nut and bolt until a prevailing torque feature thereof is encountered.

18. A method of evaluating a prevailing-torque threaded nut-bolt assembly with the machine of claim 17, the method comprising:
assembling the nut and bolt until a prevailing torque feature thereof is encountered;
detecting the bolt recess of the nut-bolt assembly; and then determining the bolt-through condition of the nut-bolt assembly.

19. A method of evaluating a prevailing-torque threaded nut-bolt assembly, the method comprising:
assembling a nut and bolt until a prevailing torque feature thereof is encountered;
constraining a rotational movement of the bolt;
linearly moving the bolt;
rotating the nut; and
coordinating the linear movement of the bolt with the rotational movement of the nut so that linear movement of the nut does not occur.

* * * * *